Sept. 14, 1943.  T. W. ROLPH  2,329,557
LUMINAIRE
Filed Jan. 11, 1941   4 Sheets-Sheet 1

INVENTOR
THOMAS W. ROLPH
BY
ATTORNEY

Sept. 14, 1943. T. W. ROLPH 2,329,557
LUMINAIRE
Filed Jan. 11, 1941 4 Sheets-Sheet 2
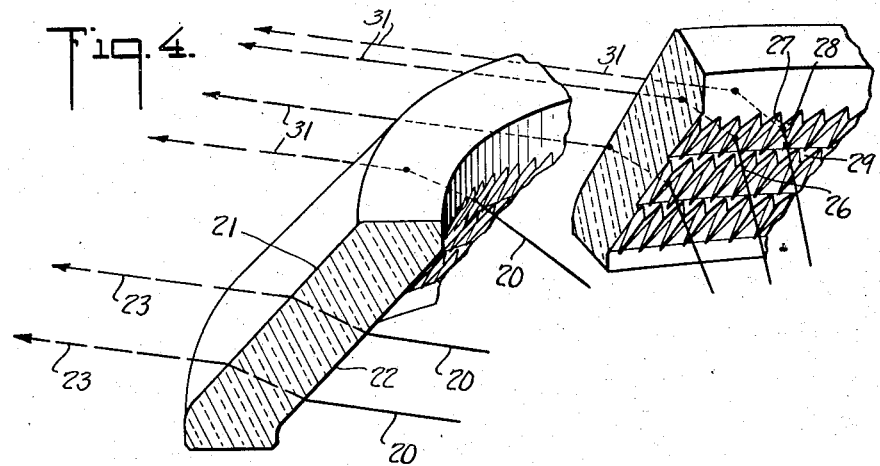
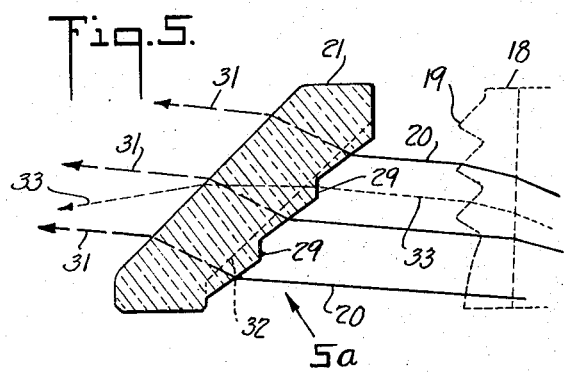
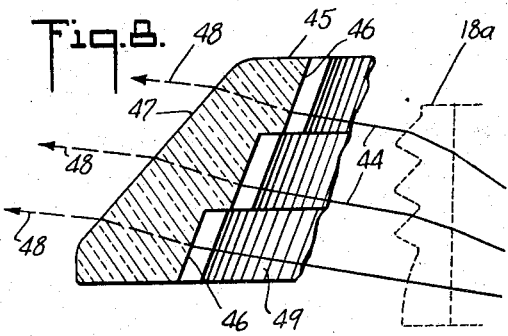
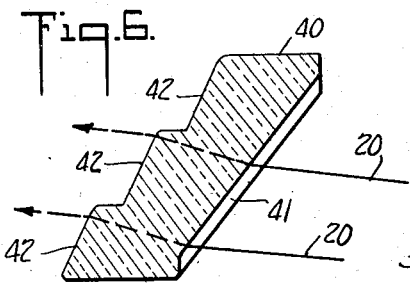
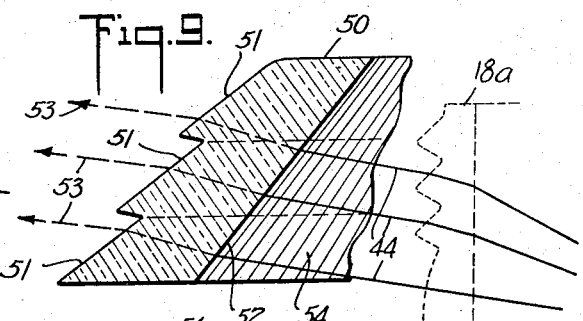
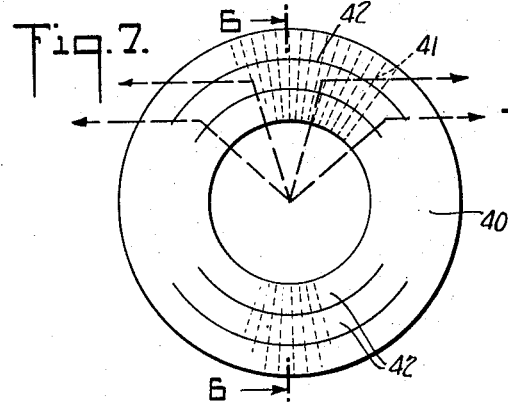
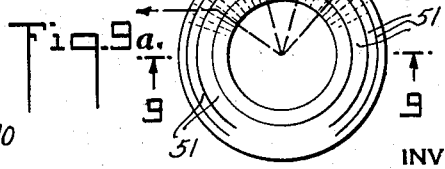
INVENTOR
THOMAS W. ROLPH
BY
ATTORNEY

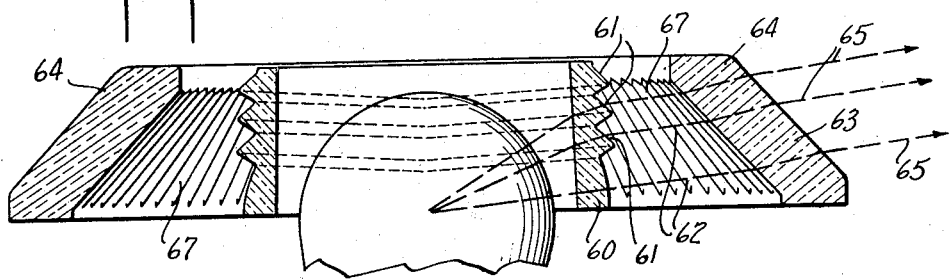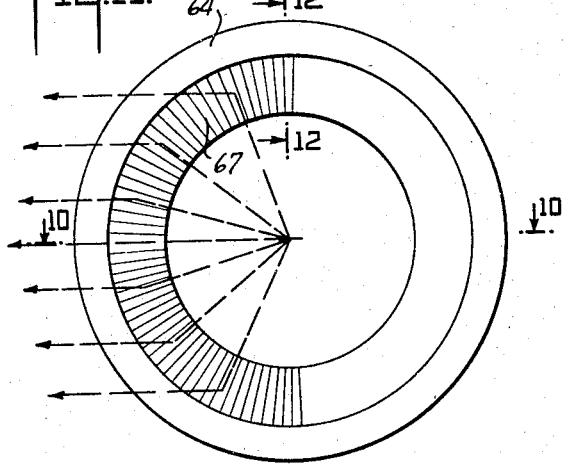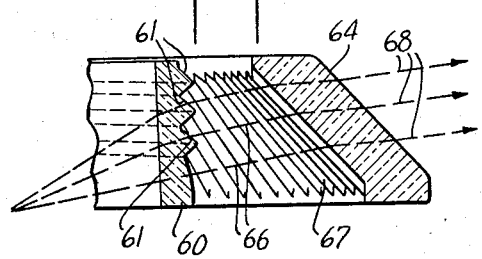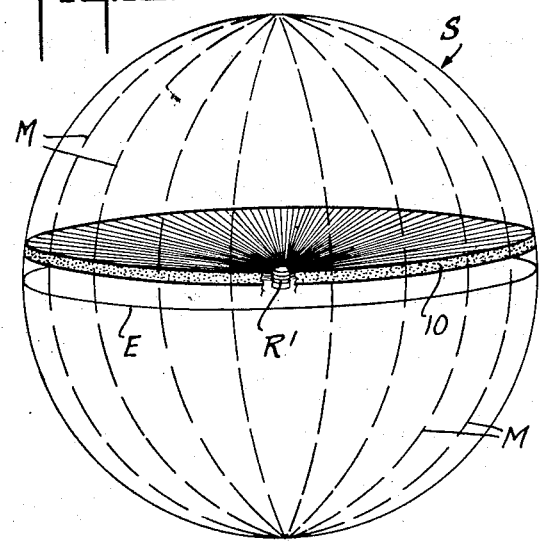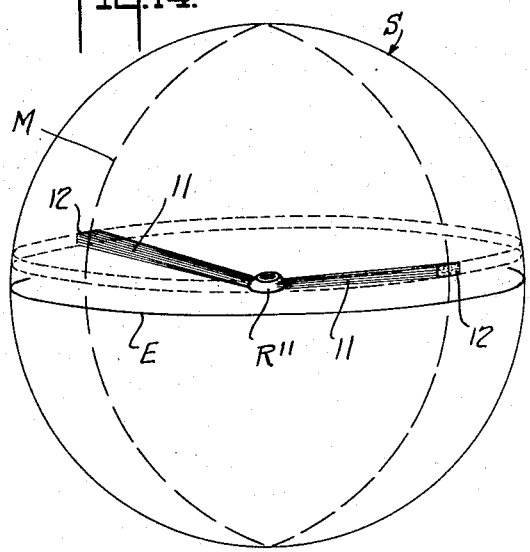

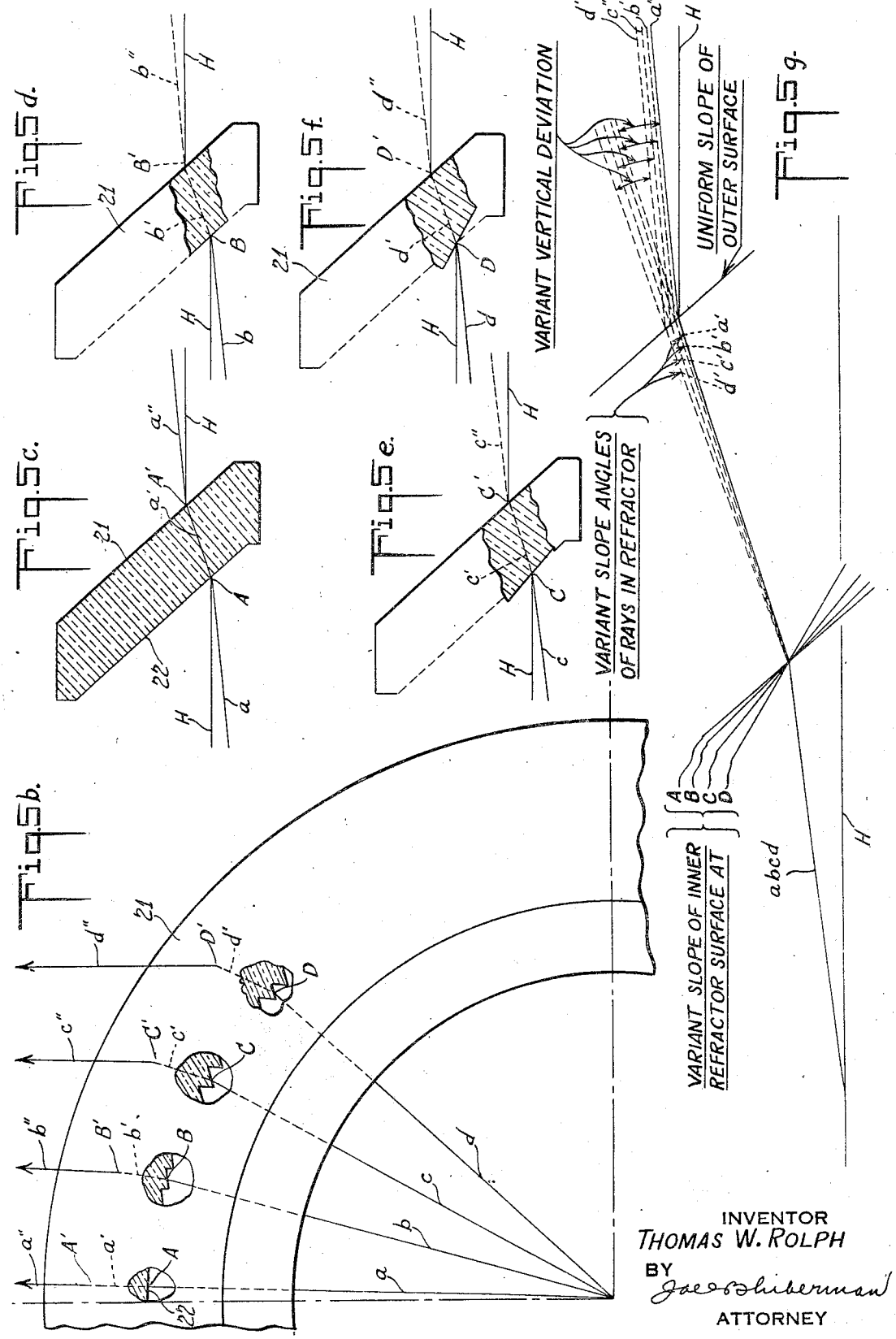

Patented Sept. 14, 1943

2,329,557

UNITED STATES PATENT OFFICE 2,329,557

LUMINAIRE

Thomas W. Rolph, Newark, Ohio, assignor to Holophane Company, Inc., New York, N. Y., a corporation of Delaware Application January 11, 1941, Serial No. 374,053

18 Claims. (Cl. 240—1.2)

The present invention relates to luminaires.

The particular embodiments of the present invention to be discussed herein are contact lights or low lying ground lights adapted to be used on landing fields of airports for giving beam indications to aviators.

The main direction in which aviators landing on a runway desire to see the indicating beams which mark the sides of the runway is in the general direction of the runway and in either direction of approach. The light should be sent out in beams which are substantially 176° apart, parallel in the general direction of the runway, and at a vertical angle of about 6°. It has heretofore been suggested to provide such contact lights in which the light is concentrated vertically by a lens having horizontal prisms and then concentrated laterally by a cylindrical lens having external vertical prisms. Such units must be mounted with the light emitting refractor above the ground level and hence unavoidably provide an eminence or rise above the ground over which the tires of the landing gear must be capable of rolling. To avoid damage to the tires the cylindrical refractor is received in a metallic cage with sloping radial fins. These fins provide pockets for the collection of dirt and snow and impair the service afforded. The number of fins required is such as to restrict the horizontal angle through which the light may be collected into the two beams substantially 180° apart and therefore the lateral concentrating prisms can only be efficiently used for a part of each half circle. The light between these systems of lateral concentrating prisms is therefore not available to reinforce the main beams and is spilled laterally of these beams.

One of the objects of the present invention is to provide a contact light for the purposes above referred to wherein the refractor is given a shape or contour, such as a low lying, truncated cone with an apex angle in the neighborhood of 90°, or a zone of a sphere of generally similar shape, and is constructed in such a way that no mechanical protection is required for the sides of the refractor. This makes it possible to avoid protecting fins, pockets for the collection of dirt, snow and the like and to allow the tires of the running gear to run directly over the exposed surface of the refractor.

In order to improve the light output the present invention contemplates the utilization of two refractors, the first an inner refractor with prisms which bend the light rays about generally horizontal axes to vertically concentrate the light into substantial parallelism in radial or meridian planes, the second an outer refractor of conical form divides this light into two substantially equal halves and turns it about sloping axes into two diametrically opposite (or substantially diametricaly opposite) directions. The two refractors cooperate to maintain all the emitted rays at the same vertical angle.

Where it is desired to concentrate direct light emitted in a solid angle from a point source and emit it in a narrow concentrated beam it is customary to employ one system of parallel prisms to provide concentration in one direction and a second system of parallel prisms extending in a direction at right angles to that of the first system to concentrate the light in a direction at right angles to the first. In typical devices for vertical concentration and lateral redistribution both forms to which the two sets of prisms are applied are generally cylindrical and the prisms are horizontal and vertical.

Prism configurations, suitable for vertical concentration and lateral redistribution where both refractors are substantially cylindrical are not suitable to produce substantial lateral deviations where the outer refractor is an upwardly converging cone with vertical axis and substantial apex angle, for when sloping radial, laterally refracting prisms are placed about such a conical form the vertical angle of the light is lowered, particularly at the greater lateral deviation. In order to secure the uniformity of vertical angle in the emitted beams, the prisms of one or the other of the refractors are adjusted in position, to compensate for the vertical deflection of the light by the outer refractor. According to the present invention, this compensation may be had by varying the disposition of the prisms which concentrate the light vertically, or by varying the disposition of the prisms which concentrate the light laterally.

The accompanying drawings show, for purposes of illustrating the present invention several of the many embodiments in which the invention may take form, it being understood that the drawings are illustrative of the invention rather than limiting the same.

In these drawings:

Figure 4 is a broken perspective view of the outer refractor illustrating the prismatic action;

Figure 5 is a fragmentary cross sectional view on the line 5—5 of Figure 3;

Figure 5b is a top plan view of a quarter section of the refractor of the preceding figures with parts broken away above representative inner prisms and showing the paths of light rays projected to the horizontal plane;

Figures 5c, 5d, 5e and 5f are sectional views taken on the planes of the rays a, b, c, d, respectively, of Figure 5b;

Figure 5g is a view in which the optical actions shown in Figures 5c, 5d, 5e and 5f are superimposed;

Figure 6 is a fragmentary cross sectional view similar to Figure 5 taken on the line 6—6 of Figure 7, and Figure 7 is a top plan view, these figures showing an outer refractor in which the compensation is obtained by providing the inner surface of the refractor with radial prisms for laterally deflecting the light and providing the outer surface of the refractor with steeper areas;

Figure 8 is a fragmentary cross sectional view similar to Figure 5 of a construction in which the concentration of light from the inner piece is at a higher vertical angle than desired and the outer refractor is designed to lower the light to the desired vertical angle and emit it in beams of parallel rays;

Figure 9 is a view similar to Figures 5 and 8, taken on the line 9—9 of Figure 9a;

Figure 9a is a fragmentary top plan view of the refractor of Figure 9;

Figure 10 is a sectional view similar to Figure 2 through a form of construction in which compensation is obtained by the prisms on the inner refractor and is taken on the line 10—10 of Figure 11;

Figure 11 is an inverted plan view of the outer refractor of Figure 10;

Figure 12 is a sectional view on the line 12—12 of Figure 11;

Figure 1:
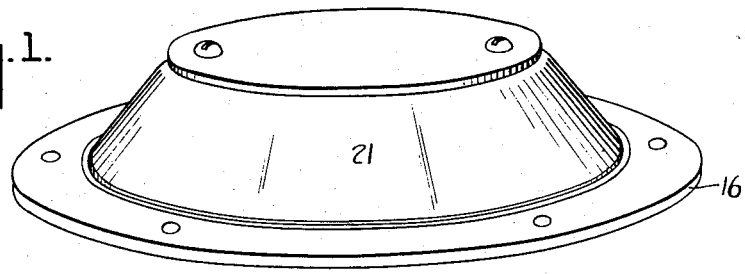
Figure 1 is a perspective view of the exposed portion of a contact or runway light.

Figure 13 is a diagrammatic view illustrating the action of inner circumferential prisms in concentrating the light into substantial parallelism in meridian planes and oblique to the equatorial plane; and Figure 14 is a view similar to Figure 13 illustrating the action of the outer lateral prisms in concentrating the output of light received by the inner prisms into diametrically opposite beams with all the light at uniform angles of obliquity to the equatorial plane.

In Figure 13 the light rays are assumed to originate in a point light source—at the center of a sphere S. The sphere is assumed to be tilted at an angle of 6° toward the observer. The equator of the sphere is indicated at E and meridians by the letter M. Near the equator of the sphere the light source is surrounded by an annular refractor R' having circumferential prisms adapted to concentrate the light. As illustrated in Figure 13, all the light accepted by these prisms is brought into substantial parallelism in meridian planes at an angle of approximately 6° above the equator. If such a refractor alone were used and the prisms uniform annularly, the light which it accepts would fall on the surface of the sphere in the form of a narrow band or zone 10 six degrees above the equator as indicated by the stippling on the drawings. The prisms on R' might have varying steepness in which case the band 10 would undulate.

Figure 14 illustrates the action of an outer conical refractor R'', such as contemplated by the present invention, in diverting the light concentrated by the refractor R' into two substantially diametrically opposite beams of parallel rays of uniform obliquity to the equatorial plane. These two beams of light are indicated by lines 11 which lead to the small areas 12, 12 on the surface of the sphere, although in practice there would be considerable spreading of light about these areas.

In the luminaire illustrated in Figures 1 to 5, a vertical lamp bulb is illustrated at 15 having its light center at LC. The lamp is carried in a socket, not shown, mounted in a fixed position relative to a horizontal metal plate 16, and the device is adapted to be sunk in the ground to bring this plate to the level of the ground. A concentric spherical reflector 17 returns the downwardly emitted light above the horizontal. The light source is surrounded by a substantially cylindrical lens 18 which corresponds to the lens R' of Figure 13. This lens 18 has circumferential prisms 19 of uniform refracting power about the vertical axis of the luminaire and adapted to concentrate the light into parallel rays, as indicated at 20. These rays correspond to the light indicated at 10 in Figure 13.

An outer conical refractor 21, corresponding with the refractor R'' of Figure 14, is placed outside the lens 18. This cone converges toward the vertical axis x—x at a comparatively steep angle as will be apparent. As more clearly shown in Figures 2 to 4, the refractor part 21 has a narrow zone 22 in which the inner and outer surfaces are parallel. Light rays, such as 23, are emitted parallel with the corresponding light rays 20 being offset owing to the thickness of the glass. The clear non-prismatic zone 22 is flanked by a small number of radial prisms 24, 24 cut at the same slope as the inner surface of the cone. These prisms act on rays, such as 25, 25 of the same vertical angle as rays 20, and emit them as indicated at 25', 25' parallel with the emitted ray 23. There will be a slight difference in vertical angle of these rays, but not of sufficient consequence to require compensation. The outer refractor is provided with a system of prisms 26 extending from the plain radial prisms 24 outwardly to meet similar prisms on the other half of the refractor. They are placed on the inner surface of the cone generated by the rotation of the line 22 and physically take the form of annular rows of projections produced by the plunger by which the glass is pressed. Each projection has a radial face 27, a tilted face 28 which is the active face of the prism and a substantially cylindrical face 29 to clear the plunger. These prisms, instead of being in planes sloping toward the same apex as do the prisms 24, are still radial but have decreasing slope as the prisms recede from the plane of the central ray 23 as indicated in Figures 5c, 5d, 5e, 5f and 5g to be discussed. The light rays, such as indicated at 30, Figure 4, passing through the glass are held at predetermined angles above the horizontal, and these angles are such that the emitted rays 31 have a vertical angle which is the same as the vertical angle of the rays 23. It will thus be apparent that the two emitted beams (such as 11—11 of Figure 14) will be made up of light rays substantially all of which are parallel and at uniform vertical angle. The adjustment of the active faces 28 compensates for the effect which would be produced had the conical refractor been provided with radial prisms of the type indicated at 24 through 180°, for then a substantial amount of the light which was diverted through the greater angles would have been lowered so much as to strike the ground rather than go up into the useful beam.

The small areas 32 between the active surfaces 28 and the inactive surfaces 27 of the next adjacent prism permit the escape of small amounts of light in radial directions at about 6° above the horizontal. The small cylindrical areas 29 between the annular rows of prisms bend rays, such as 33, down to the ground.

Figure 5A:
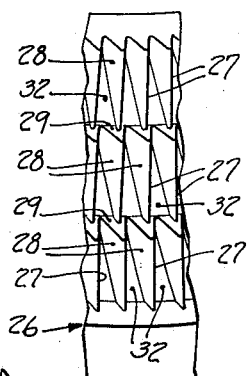
Figure 5a is a fragmentary elevational view taken in the direction of the arrow 5a of Figure 5.

Figures 5b to 5g, inclusive, further illustrate the optics of the outer refractor. Here the rays are all indicated by small letters. Figure 5b is a top plan view of a quadrant section of the refractor with parts broken away above representative prisms and shows the paths of light rays projected to the horizontal plane.

As shown in Figures 5b and 5c the ray a proceeding at a slight angle above the horizontal H strikes an element A of the conical surface 22 and proceeds in the same horizontal direction, there being an upward deviation at A and an equal downward deviation at A' so that it merges at the same angle above the horizontal H as it originally had. The upward and downward deviations are the same because the slope at A and A' is equal. The path of the ray a in the refractor is indicated at a' and in air at a'', and in Figure 5c all these lines are full as the ray path is in the plane of the paper.

In Figure 5d, 5e and 5f the rays b, c and d are at the same angle above the horizontal H as ray a and strike the refractor at B, C, D, respectively, where the varying slope of the prism surfaces in radial planes is indicated. These rays are laterally and vertically deviated differing amounts, as indicated by b', c' and d'. These lines are dotted in Figures 5d, 5e and 5f because the rays are no longer in the plane of the paper. This brings them to the uniformly sloping outer surface of the refractor at B', C' and D', respectively. Here the rays are bent both laterally and vertically as indicated at b'', c'' and d'', respectively. These rays are at the same angle above the horizontal as before and are shown in dotted lines because they are not in the plane of the paper.

The separate showings in Figures 5c, 5d, 5e and 5f are all superimposed in Figure 5g where the refractive action on rays a, b, c, d at a uniform angle above the horizontal H and caused by the variant slopes of the inner surfaces A, B, C, D brings about variant angles of slope of the rays in the refractor. The difference in slope between the inner and outer surfaces of the refractor increases as the prisms are more and more remote from the smooth section, and this increase in difference in slope accompanies the increase in depth of the prisms to provide for the greater lateral deflection. While, as shown in Figure 5g, there is a variant vertical angle of the rays in the refractor, the vertical deviation at the emergent surface (which accompanies the lateral deviation) is greater in an amount for each ray to bring it back to the proper vertical angle.

Thus the tilting of the inner surface changes the ray paths so as to compensate for the depression of the rays which must occur when they are emitted through the outer surfaces and laterally concentrated at the same time.

Figure 2:
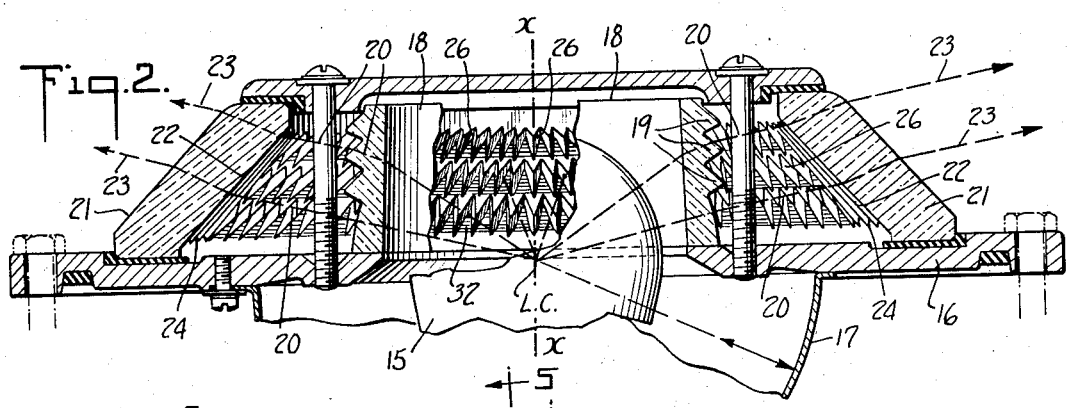
Figure 2 is a vertical sectional view through the same taken on the plane parallel with the runway and in which vertical concentration only is obtained.
Figure 3:
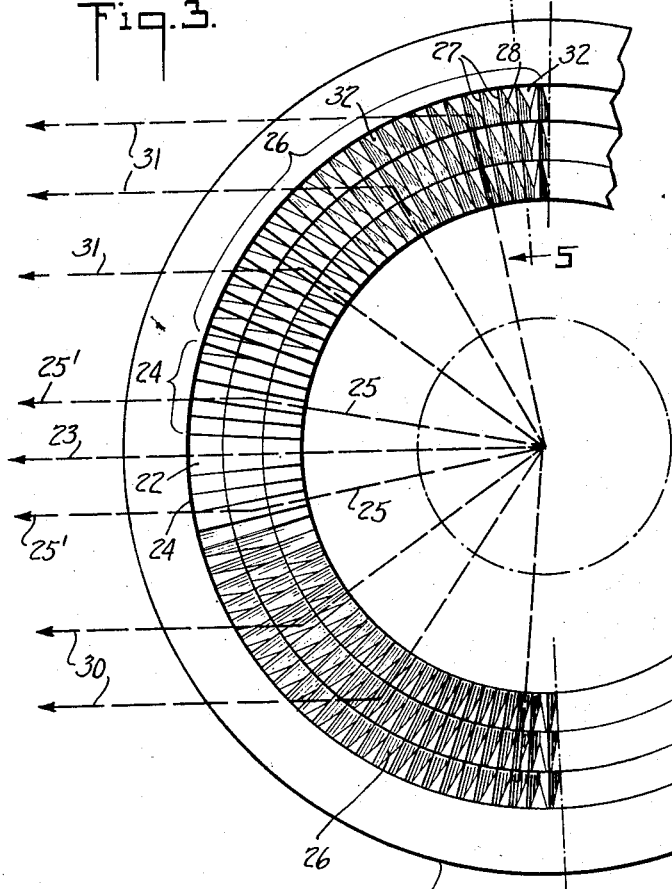
Figure 3 is an inverted plan view of the outer refractor and illustrates the deviation of the light in horizontal planes by this refractor.

Figures 6 and 7 show an outer refractor 40 having on its inner surface simple radial prisms 41 adapted to receive rays from a concentrating lens, such as the lens 18 Figure 2, and on the outer surface steps 42 which are steeper than the inner prisms. These angles are adjusted so that the steeper areas 42 opposite the deeper prisms 41 compensate for the depression of the ray in the glass.

In the arrangement shown in Figure 8 the inner lens 18a is similar to the lens 18 but designed to emit parallel rays 44, corresponding with the rays 20 of the previous figures, at higher angles above the horizontal. The outer refractor 45 is thicker at the bottom than at the top, as will be apparent from the drawings, and it is provided with smooth areas 46, 46 stepped as shown and corresponding with each smooth area 22 of the refractor of Figures 2 to 5. The angle between the surface 46 and the outer surface 47 of the refractor 45 is such that the light is lowered sufficiently to emit the rays 48 at the desired angle (6°) above the horizontal. The inner surface of the refractor 45 is provided with systems of radial prisms indicated by the sloping lines 49. These prisms deviate the light laterally and the relative steepness of the incident and emergent surfaces are such that all the rays are emitted at the uniform angle above the horizontal.

The outer generally conical refractor 50 of Figure 9 is designed for use with a cylindrical lens of the type shown in Figure 8 wherein the rays 44 are at a higher angle. The refractor 50 has external prisms 51 opposite the smooth area 52 (corresponding with smooth area 22 of refractor 20) so that the rays 53 are depressed to the desired vertical angle. The refractor has inner radial prisms 54 to produce lateral redirection and these, as above set forth, effect a lowering of the rays. The external prisms 51 have their greatest depth opposite the smooth area 52 and decrease in depth as the inner prisms 54 get deeper, until they disappear as indicated by the arcs 51 of Figure 9a.

In the arrangement shown in Figures 10, 11 and 12 the inner cylindrical lens 60 has circumferential prisms 61 in which the slope of the emergent surfaces is not uniform throughout the circumference. The steepness of the prisms on the line 10—10 of Figure 11 is the same as that of the prisms on the lens 18 of Figure 2, and hence rays, such as 62 in the plane of Figure 10, will be emitted at the desired angle 6° above the horizontal. These rays will pass through the clear section 63 of the outer refractor 64 and be emitted at 65 in the same way as the ray 23 of Figure 2. In order that the light rays emitted by the inner refractor at wider and wider angles from the plane of 10, 10 will be at higher angles than the rays 62, the prisms 61 are made of decreasing steepness as the plane of Figure 12 is approached, and at this plane the steepness is such that the rays 66 are at substantially higher angles than the rays 62. The vertical angle may be the same as that of rays 44 of Figure 8. The rays 66 are intercepted by plain radial prisms 67 carried on the inner surface of the outer refractor 64 and are laterally refracted to be emitted, as indicated at 68, parallel with the ray 65. The amount of change of vertical angle of the rays emitted by the inner piece is adjusted so that it equals the depression of the corresponding rays as they pass through and are emitted from the outer refractor.

While the discussions above relate to arrangements wherein all the compensation is obtained in one of the refractor parts, it is believed to be obvious from the above disclosure that the inner prisms may be arranged to have insufficient compensation for use with non-compensating outer prisms and then be supplemented by partially compensating outer prisms to complete the compensation. In general, however, the inner piece will concentrate at the correct vertical angle and the compensation provide elevation where needed, or the inner piece will concentrate at too high a vertical angle and the compensation provide depression of this angle where needed. In the first case, the compensation is needed most where the lateral change in the light direction is greatest or opposite the deepest radial prisms. In the second case, the compensation is desired where there is little or no lateral concentration. This is opposite the plain space and the shallow radial prisms. The compensation is greatest where the difference in slope between the inner surface and the outer surface of the outer piece is greatest. In the cases where the difference in slope is an elevating compensation the difference in slope is the greatest where the internal radial prisms are deepest. In the cases where the difference in slope provides a depressing compensation, this difference in slope is the least (or zero) where the radial prisms are deepest.

While the refractor has been described as conical it will be understood that it might depart somewhat from the conical shape to become a small portion of a sphere or other similar shape, if desired.

Usually the refracting equipment will be made of two pieces of crystal glass but it might be made in a single piece, in colors, or it might be made in some other refracting and transmitting material, such as plastic.

Since it is obvious that the invention may be embodied in other forms and constructions within the scope of the claims, I wish it to be understood that the particular forms shown are but a few of these forms, and various modifications and changes being possible, I do not otherwise limit myself in any way with respect thereto.

What is claimed is:

1. A luminaire comprising a light source and an annular prismatic refractor giving a symmetric distribution of light concentrated about the surface of a wide angle cone whose axis coincides with the axis of the refractor, and a second prismatic refractor with coinciding axis, the second refractor producing concentration circumferentially of the cone, in which prisms of the second refractor which give different degrees of circumferential concentration are placed at different degrees of slope from the opposed surface of the second refractor to compensate for the distortion of the conical concentration produced by the differing degrees of circumferential concentration.

2. A luminaire comprising a light source and a ring shaped refractor carrying horizontal prisms to produce vertical concentration of light in a conical beam whose elevation above the horizontal in all directions is in the neighborhood of 6°, together with an outer generally cone-shaped prismatic refractor receiving the conical beam of light and concentrating it circumferentially to produce increased candlepower in predetermined lateral directions at the same elevation above the horizontal, the prisms of the second refractor being placed at varying slopes from the opposed surface of the refractor, the slope variation around the refractor being such as to provide substantially no change in the vertical angle of the beam above the horizontal.

3. The combination with a substantially point light source, of a refractor having an inner part and an outer part wherein the inner part is generally cylindrical about a vertical axis through the source and has a system of generally horizontally extending prisms to redirect the rays toward a horizontal plane and wherein the outer part is generally conical about said axis and extends outwardly from one end of the inner part and wherein said outer part has a system of light concentrating prisms crossing the generally horizontal prisms and of variant refracting power on opposite sides of a vertical radial plane through the source to deviate light towards said radial plane, the opposed prismatic elements of one system being progressively adjusted in angular relation in a direction and an amount relative to the opposed prismatic elements of the other system to compensate for the depression of the rays caused by the concentrating action of the outer part so that all the rays passing successively through said systems of prisms are emitted from the outer part at substantially the same angle above the horizontal.

4. The combination with a substantially point light source, of a refractor having an inner part and an outer part wherein the inner part is generally cylindrical about a vertical axis through the source and has a system of annular horizontal prisms to redirect the rays to a uniform angle of elevation wherein the outer part is generally conical about said axis and extends outwardly from one end of the inner part and wherein said outer part has a system of light concentrating prisms crossing the generally horizontal prisms and of variant refracting power on opposite sides of a vertical radial plane through the source to deviate light towards said radial plane, the refracting power of the prismatic elements of the outer part and the variation in slope of said prismatic elements in radial planes circumferentially about the refractor being such as to maintain a uniform vertical deviation of the light rays about said refractor.

5. The combination with a substantially point light source, of a refractor having an inner part and an outer part wherein the inner part is generally cylindrical about a vertical axis through the source and has a system of generally horizontally extending prisms to redirect the rays toward a horizontal plane and wherein the outer part is generally conical about said axis and extends outwardly from one end of the inner part and wherein said outer part has a system of radially disposed, light concentrating prisms crossing the generally horizontal prisms and of variant refracting power on opposite sides of a vertical radial plane through the source to deviate light towards said radial plane, the prisms of the inner part having variant light depressing power on opposite sides of said radial plane an amount to compensate for the depression of the rays caused by the concentrating action of the outer part so that all the rays passing successively through said systems of prisms are emitted from the outer part at substantially the same angle above the horizontal.

6. In combination, a substantially point light source, an inner refractor having a system of circumferential light refracting prisms about a vertical axis through the source to redirect the light rays toward a horizontal plane, and an outer coaxial conical refractor having a system of prisms transverse of the first prisms, symmetrical about an intermediate vertical radial plane and of variant refracting power to transmit and laterally deviate the rays from the inner refractor toward said intermediate plane and wherein the slope of the second prisms in radial planes and their refracting power is such that the variant lateral deviation of the rays would normally be accompanied by a variant vertical deviation thereof to bring them more nearly horizontal, the opposed prismatic elements of the two refractors which act successively being adjusted in angular relationship an amount relative to the opposed prismatic elements of the other system to compensate for the downward deviation of the outer prismatic element so that the vertical angle of all the emergent rays is substantially uniform.

7. In combination, a substantially point light source, an inner refractor having a system of annular light refracting prisms about a vertical axis through the source to redirect the light rays toward a horizontal plane, and an outer coaxial conical refractor having a system of prisms transverse of the first prisms, symmetrical about an intermediate vertical radial plane and of variant refracting power to transmit and laterally deviate the rays from the inner refractor toward said intermediate plane and wherein the refracting power of the second prisms and the variation in slope of said second prisms in radial planes circumferentially about the refractor is such as to maintain a uniform vertical deviation of the light rays about said refractor.

8. In combination, a substantially point light source, an inner refractor having a system of circumferential light refracting prisms about a vertical axis through the source to redirect the light rays toward a horizontal plane, and an outer, coaxial conical refractor having a system of prisms transverse of the first prisms, symmetrical about an intermediate vertical radial plane and of variant refracting power to transmit and laterally deviate the rays from the inner refractor toward said intermediate plane and wherein the slope of the second prisms in radial planes and their refracting power is such that the variant lateral deviation of the rays would normally be accompanied by a variant vertical deviation thereof to bring them more nearly horizontal, the prismatic elements of the inner refractor having variant light depressing power on opposite sides of said radial plane to compensate for the downward deviation of the outer prismatic element so that the vertical angle of all the emergent rays is substantially uniform.

9. A two-part refractor adapted for use with a point light source, the inner refractor part having circumferential light refracting prisms about a normally vertical axis through the source to redirect the light rays toward a horizontal plane, the outer part having radially disposed, opposed prisms of variant refracting power for laterally deviating the refracted rays toward a vertical radial plane, the outer prisms being uniform lengthwise and sloping downwardly and outwardly in radial directions whereby the lateral deviation would normally be accompanied by vertical deviation of the rays, the prisms on the inner part having variant light refracting power on opposite sides of said radial plane to compensate for the vertical deviation of the outer prismatic element so that the vertical angle of all the emergent rays is substantially uniform.

10. In combination, a substantially point light source, an inner arcuate refractor above the source having light refracting prisms of uniform refracting power about a normally vertical axis through the source to emit said light at low angles above the horizontal without change in radial direction, and an outer concentric conical, transparent light transmitter whose inner and outer walls are at substantially flatter angles than the cone normal to the light emitted by the first refractor, said transmitter having prisms for effecting a lateral shift of the rays and whose inner active surfaces extend in planes oblique to intersecting radial planes in a direction such that the angles of incidence at said surfaces are less than the corresponding angles of incidence of radial prisms of the same lateral refracting power whereby a lesser depression of the rays in the transmitter is obtained.

11. A luminaire comprising a substantially point light source, an annular refractor construction having annular prisms to produce concentration in vertical directions and radial prisms of varying depth to produce concentration in circumferential directions, the annular prisms varying in depth circumferentially to compensate for the minor variation in vertical elevation of light produced by varying depths of the radial prisms, so that the light acted upon by both sets of prisms is emitted from the construction at substantially the same vertical elevation.

12. In a luminaire, a substantially point light source located in space at the center of an imaginary sphere, and a light transmitter having a system of circumferential light concentrating prisms disposed about a polar axis, and a second system of prisms of variant refracting power disposed upon a generally conical form converging toward the polar axis the prism systems having their opposed surfaces at the necessary angles to the equatorial plane and to an intermediate meridian plane to divert the rays traversing both systems toward said intermediate meridian plane and emit them at a uniform angle of obliquity to the equatorial plane.

13. In a luminaire, a substantially point light source, located in space at the center of an imaginary sphere, and a light transmitter comprising an inner refractor which is annular about a polar axis and has a system of circumferential light concentrating prisms on the outside thereof to concentrate light into a meridionally narrowed, circumferentially extending region, and an outer generally cone shaped refractor provided on the inner side thereof with a second system of prisms of variant refracting power so arranged as to concentrate the light of said region into oppositely disposed zones of said region with uniform angular deviation of said light with respect to the equatorial plane.

14. In a luminaire, a substantially point light source, located in space at the center of an imaginary sphere, and a light transmitter comprising an inner refractor which is annular about a polar axis and has a system of annular prisms on the outside thereof to concentrate light from said source into a conical shell symmetrical about said polar axis and with its apex in the equatorial plane of the sphere, and an outer generally cone-shaped refractor having a second system of prisms of variant refracting power so arranged as to concentrate said light into oppositely disposed zones of the shell while maintaining the angular deviation of said light with respect to said equatorial plane.

15. In a luminaire, a substantially point light source, located in space at the center of an imaginary sphere, and a light transmitter comprising an inner refractor which is annular about a polar axis and has a system of circumferential light concentrating prisms of non-uniform refracting power on the outside thereof to concentrate light into a meridionally narrowed, circumferentially extending region and of varying angles of obliquity to the equatorial plane, and an outer generally cone-shaped refractor having a second system of prisms of variant refracting power so arranged as to concentrate the light of said region into oppositely disposed zones of said region with uniform angular deviation of said light with respect to said equatorial plane.

16. An annular refractor varying in inside and outside diameters between a maximum at one end and a minimum at the other end and having about its vertical axis a system of radial prisms arranged symmetrically with respect to an axial plane, said prisms varying in refracting power away from said axial plane, and so positioned as to deviate light originating at a point in the axis of said shell toward said axial plane, the slopes of opposed surfaces of said prisms varying in such a manner around said shell as to maintain substantially uniform, for all of said prisms, the vertical angle of the emergent light.

17. An annular refractor of varying diameter between its ends having about its vertical axis a system of radial refracting prisms so arranged that the angles which the incident faces of the prisms make with both the outer surface of the refractor and the vertical axis vary circumferentially about the refractor, the angles between said faces and the axis being greatest where the angles between said faces and the outer surface are the greatest.

18. An annular refractor of varying diameter between its ends having about its vertical axis a system of radial refracting prisms so arranged that the angles which the incident faces of the prisms make with both the outer surface of the refractor and the vertical axis, vary circumferentially about the refractor, the angles between said faces and the axis being least where the angles between said faces and the outer surface are the greatest.

THOMAS W. ROLPH.